(12) United States Patent
Jang (10) Patent No.: US 8,876,315 B2
(45) Date of Patent: Nov. 4, 2014

(54) LIGHTING APPARATUS AND DISPLAY APPARATUS USING THE SAME

(75) Inventor: Young Bae Jang, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 348 days.

(21) Appl. No.: 13/363,142

(22) Filed: Jan. 31, 2012

(65) Prior Publication Data

US 2012/0327633 A1 Dec. 27, 2012

(30) Foreign Application Priority Data

Jun. 24, 2011 (KR) ........................ 10-2011-0061712

(51) Int. Cl.
G09F 13/04 (2006.01)
F21V 8/00 (2006.01)
G02F 1/1335 (2006.01)
G02F 1/1333 (2006.01)
G02B 7/00 (2006.01)

(52) U.S. Cl.
CPC ............ *G02F 1/133308* (2013.01); *G02B 7/00* (2013.01); *G02B 6/0088* (2013.01); *G02B 6/009* (2013.01); *G02F 1/133603* (2013.01); *G02F 2201/46* (2013.01)
USPC ....................................... 362/97.1

(58) Field of Classification Search
None
See application file for complete search history.

(56) References Cited

U.S. PATENT DOCUMENTS

| 6,611,302 | B1 | 8/2003 | Ueda et al. ...................... 349/58 |
| 7,349,040 | B2 * | 3/2008 | Lee et al. ........................ 349/58 |
| 7,453,192 | B2 * | 11/2008 | Lee .............................. 313/288 |
| 7,474,523 | B2 * | 1/2009 | Kim et al. ....................... 349/56 |
| 7,911,775 | B2 * | 3/2011 | Azami ......................... 361/679.21 |
| 8,439,550 | B2 * | 5/2013 | Sohn ........................... 362/633 |
| 2001/0026334 | A1 * | 10/2001 | Natsuyama ..................... 349/58 |
| 2002/0097354 | A1 * | 7/2002 | Greiner .......................... 349/61 |
| 2005/0018101 | A1 | 1/2005 | Choi et al. ....................... 349/58 |
| 2011/0194034 | A1 | 8/2011 | Shimizu ........................ 348/739 |
| 2012/0327633 | A1 * | 12/2012 | Jang ............................ 362/97.1 |

FOREIGN PATENT DOCUMENTS

WO WO 2010/058625 A1 5/2010

OTHER PUBLICATIONS

European Search Report dated Oct. 23, 2012 issued in Application No. 12 15 3085.

* cited by examiner

*Primary Examiner* — Britt D Hanley
(74) *Attorney, Agent, or Firm* — Ked & Associates, LLP (57) ABSTRACT

Disclosed are a backlight unit and a display apparatus using the same. The backlight unit includes a bottom chassis, and a panel guide module coupled to a corner region of the bottom chassis so as to support a display panel. The panel guide module includes a support plate to support a corner region of the display panel, a reinforcing rib disposed on the support plate, and a fixing rib disposed under the support plate and configured to be coupled to the bottom chassis.

20 Claims, 10 Drawing Sheets

LIGHTING APPARATUS AND DISPLAY APPARATUS USING THE SAME

CROSS REFERENCE TO RELATED APPLICATION

This application claims priority under 35 U.S.C. §119 to Korean Patent Application No. 10-2011-0061712, filed in Korea on Jun. 24, 2011, which is hereby incorporated in its entirety by reference as if fully set forth herein.

TECHNICAL FIELD

Embodiments relate to a backlight unit and a display apparatus using the same.

BACKGROUND

Generally, representative large-scale display apparatuses include Liquid Crystal Displays (LCDs), Plasma display Panels (PDPs), etc.

Unlike self-emission type PDPs, LCDs essentially need a separate backlight unit due to absence of self light emitting devices.

Backlight units for use in LCDs are classified into edge type backlight units and vertical type backlight units according to positions of light sources. In an edge type backlight unit, light sources are disposed at left and right edges or upper and lower edges of an LCD panel and a light guide plate is disposed to uniformly distribute light throughout a surface of the LCD panel, which ensures uniform luminance and enables production of an extremely thin display panel.

A vertical type backlight unit is normally applied to displays of 20 inches or more. The vertical type backlight unit advantageously has greater light efficiency than the edge type backlight unit owing to a plurality of light sources being disposed below a panel and thus, is mainly used in a large-scale display requiring high luminance.

Conventional edge type or vertical type backlight units have adopted Cold Cathode Fluorescent Lamps (CCFL) as a light source.

The backlight units using CCFLs, however, have several disadvantages, such as consumption of a great quantity of power because power should always be applied to a CCFL, low color reproduction efficiency of about 70% that of a Cathode Ray Tube (CRT), and environmental pollution due to use of mercury.

Currently, backlight units using Light Emitting Diodes (LEDs) are being studied as a solution to the above described problems.

In the case of backlight units using LEDs, turning on or off a part of an LED array is possible, which can achieve remarkable reduction in power consumption. In particular, RGB LEDs exhibit color reproduction beyond 100% of a color reproduction range proposed by the National Television System Committee (NTSC) and can provide more vivid images to consumers.

SUMMARY

Embodiments provide a backlight unit, which employs a simplified configuration of a panel guide module to support a panel, thereby achieving a reduced weight and lower manufacturing costs.

In one embodiment, a backlight unit includes a bottom chassis, and a panel guide module coupled to a corner region of the bottom chassis so as to support a display panel, wherein the panel guide module includes a support plate to support a corner region of the display panel, a reinforcing rib disposed on the support plate, and a fixing rib disposed under the support plate and configured to be coupled to the bottom chassis.

The support plate may have at least two fastening holes, through which fastening screws for coupling with the bottom chassis penetrate.

The support plate may include a first region having first, second, third and fourth sides, on which the reinforcing rib and the fixing rib are disposed, a second region extending from the first side of the first region and having at least one fastening hole, through which a fastening screw for coupling with the bottom chassis penetrates, and a third region extending from the second side adjacent to the first side of the first region and having at least one fastening hole, through which a fastening screw for coupling with the bottom chassis penetrates.

A corner region of the display panel may be seated on parts of the first, second and third regions of the support plate, and the reinforcing rib may protrude from an upper surface of the support plate and may be formed on a corner region of the support plate in a matrix shape.

The fixing rib may include a fixing plate disposed under the support plate, and first and second ribs extending from the fixing plate and configured to be coupled to the bottom chassis, and the first and second ribs may be spaced apart from each other by a first distance to define a space for insertion of the bottom chassis.

The first rib may be located inside the bottom chassis and the second rib may be located outside the bottom chassis, and a thickness of the first rib may be greater than a thickness of the second rib.

The first distance between the first and second ribs may be greater than a thickness of the bottom chassis.

The bottom chassis may include a bottom surface disposed to face the display panel, and a lateral surface extending from the bottom surface to surround a periphery of the bottom surface, wherein the lateral surface may include a first segment extending from an edge of the bottom surface in a direction perpendicular to the bottom surface, a second segment extending from an edge of the first segment in a direction parallel to the bottom surface, and a third segment extending from an edge of the second segment in a direction parallel to the first segment so as to face the first segment.

The first segment may be disposed at a corner region thereof with a coupling recess for coupling with the fixing rib of the panel guide module, and the second segment may be disposed at a corner region thereof with at least two fastening holes, through which a fastening screw for coupling with the support plate of the panel guide module penetrates.

The support plate of the panel guide module may come into contact at a lower surface thereof with a corner region of the second segment, and a distal end of the second segment may coincide with a distal end of the support plate of the panel guide module, or may be located at a predetermined distance from the distal end of the support plate of the panel guide module.

The second segment may be disposed at an edge region thereof adjacent to the third segment with a coupling protrusion for coupling with a top chassis, and the coupling protrusion may have at least one fastening hole, through which a fastening screw for coupling with the top chassis penetrates.

BRIEF DESCRIPTION OF THE DRAWINGS

Arrangements and embodiments may be described in detail with reference to the following drawings in which like reference numerals refer to like elements and wherein.

DESCRIPTION OF SPECIFIC EMBODIMENTS

Hereinafter, embodiments will be described with reference to the annexed drawings.

It will be understood that when an element is referred to as being 'on' or 'under' another element, it can be directly on/under the element, and one or more intervening elements may also be present.

Also, when an element is referred to as being 'on' or 'under', 'under the element' as well as 'on the element' can be included based on the element.

Figure 1:
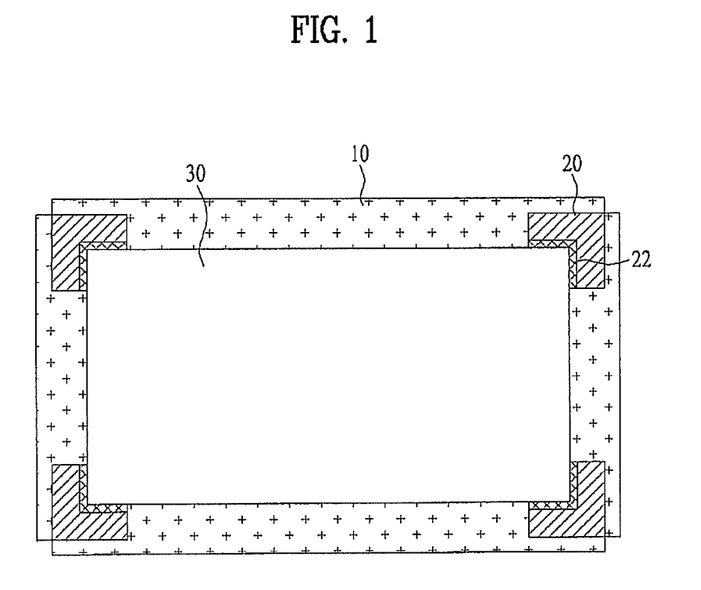
FIGS. 1 and 2 are views illustrating a backlight unit according to an embodiment.
Figure 2:
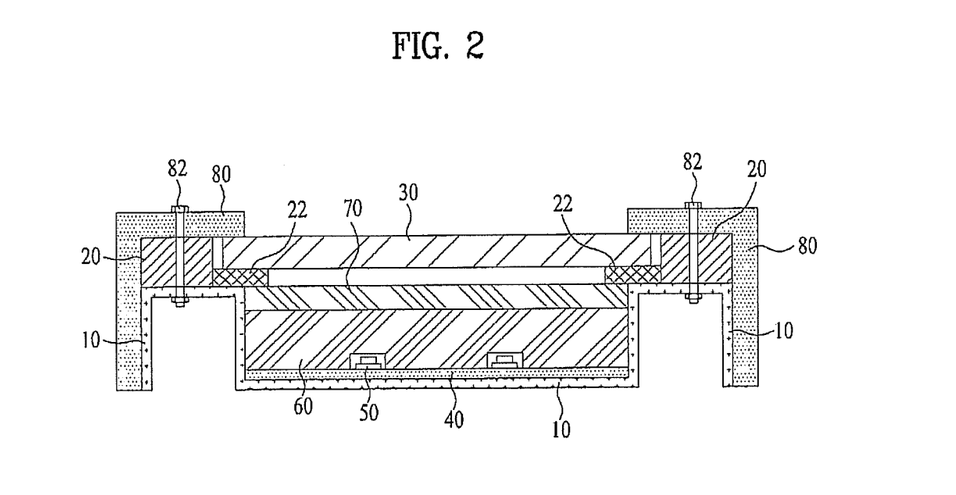

FIGS. 1 and 2 are views illustrating a backlight unit according to an embodiment, FIG. 1 being a plan view and FIG. 2 being a sectional view.

More particularly, FIG. 1 is a plan view illustrating a backlight unit from which a top chassis has been removed, and FIG. 2 is a sectional view illustrating a backlight unit including a top chassis.

As illustrated in FIGS. 1 and 2, the backlight unit may include a bottom chassis 10 and a panel guide module 20.

The panel guide module 20 may be coupled to a corner region of the bottom chassis 10 and serve to support a display panel 30.

The panel guide module 20 may include a support plate 22 to support a corner region of the display panel 30.

A reflector 40 may be disposed on the bottom chassis 10, and a light guide plate 60 may be disposed on the reflector 40.

The light guide plate 60 may have at least one recess indented in a lower surface thereof. The recess may have a rectangular, semispherical, triangular-pyramidal, square-pyramidal, polygonal pyramidal or conical cross section.

A light source 50 may be inserted into the recess of the light guide plate 60, and an optical member 70 may be disposed on the light guide plate 60.

The light source 50 may include a substrate and at least one light emitting element disposed on the substrate. In some embodiments, both the substrate and the light emitting element may be accommodated in the recess of the light guide plate 60. Additionally, in some embodiments, the substrate may be located at the outside of the recess of the light guide plate and only the light emitting element may be located in the recess of the light guide plate 60.

The panel guide module 20 is disposed at the corner region of an edge region of the bottom chassis 10 and the display panel 30 may be seated on the support plate 22 of the panel guide module 20.

A top chassis 80 may be configured to surround the panel guide module 20 and the bottom chassis 10 and may be coupled to both the panel guide module 20 and the bottom chassis 10 by means of fastening screws 82.

More specifically, the top chassis 80, the bottom chassis 10 and the panel guide module 20 may be coupled to one another by means of fastening holes formed at the same positions thereof and the fastening screws 82 penetrating through the fastening holes.

In the backlight unit having the above described configuration, the reflector 40 may contain at least one of a metal and metal oxide. For example, the reflector 40 may be formed of a metal or metal oxide having high reflectivity, such as aluminum (Al), silver (Ag), gold (Au) or titanium dioxide ($TiO_2$).

The light guide plate 60 may be formed of any one selected from among acryl-based resin, such as polymethylmethacrylate (PMMA), and other resins, such as polyethylene terephthalate (PET), Cyclic Olefin Copolymers (COC), polyethylene naphthalate (PEN), polycarbonate (PC), polystyrene (PS) and mathacylate styrene (MS).

As occasion demands, the light emitting element of the light source 50 may be a top view type light emitting diode, or may be a side view type light emitting diode.

The light emitting element may be a Light Emitting Diode (LED) chip. The LED chip may be a blue LED chip or ultraviolet LED chip, or may be a package combining at least one or more selected from among a red LED chip, green LED chip, blue LED chip, yellow green LED chip and white LED chip.

A white LED may be realized by coupling a yellow phosphor to a blue LED, by coupling both red and green phosphors to a blue LED, or by coupling yellow, red and green phosphors to a blue LED.

The optical member 70 serves to diffuse light emitted through the light guide plate 60. The optical member 70 may have a roughened pattern on an upper surface thereof in order to increase light diffusion efficiency.

The optical member 70 may be formed in multiple layers, and the roughened pattern may be formed on a surface of an uppermost layer or any one layer.

The roughened pattern may be a stripped pattern aligned in a longitudinal direction of the light source 50.

In this case, the roughened pattern may be defined by raised portions on the surface of the optical member 70 and each raised portion consists of first and second surfaces, which face each other to define an acute angle or an obtuse angle therebetween.

As occasion demands, the optical member 70 may include at least one sheet selected from among a diffusion sheet, a prism sheet, a luminance increasing sheet and the like.

The diffusion sheet serves to diffuse light emitted from the light source, the prism sheet serves to guide the diffused light to a light emission area, and the luminance increasing sheet serves to increase luminance.

Figure 3A:
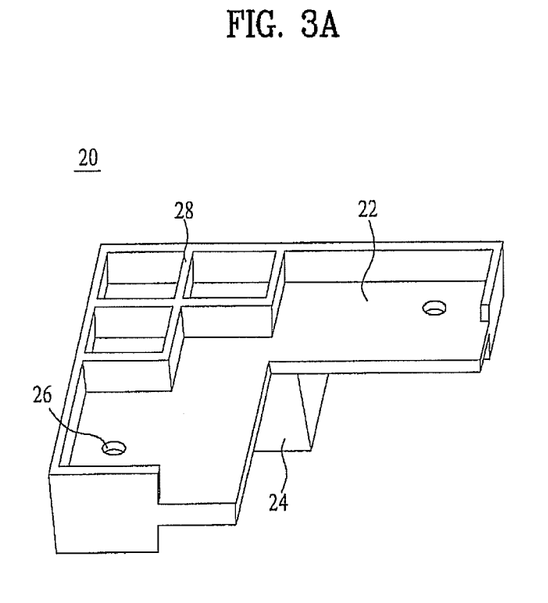
FIGS. 3A and 3B are perspective views illustrating a panel guide module of FIG. 1C in detail.
Figure 3B:
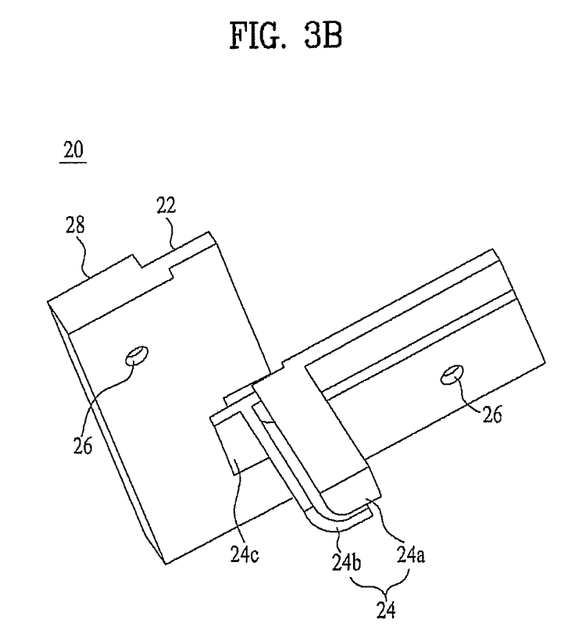

FIGS. 3A and 3B are perspective views illustrating the panel guide module of FIG. 1C in detail, FIG. 3A being a perspective view illustrating an upper surface of the panel guide module, and FIG. 3B being a perspective view illustrating a lower surface of the panel guide module.

As illustrated in FIGS. 3A and 3B, the panel guide module 20 may include the support plate 22, a reinforcing rib 28, and a fixing rib 24.

The support plate 22 may be configured to support the corner region of the display panel (30, FIG. 1) and the reinforcing rib 28 may be disposed on the support plate 22 to prevent bending of the support plate 22.

The fixing rib 24 may be disposed under the support plate 22 and be coupled to the bottom chassis (10, FIG. 1).

The support plate 22 may include at least two fastening holes 26, through which the fastening screws (82, FIG. 2) for coupling with the bottom chassis (10, FIG. 1) penetrate.

In an embodiment, the support plate 20 may be divided into first, second and third regions.

The first region of the support plate 20 is a region where the reinforcing rib 28 and the securing rib 24 are disposed and may have four sides including first, second, third and fourth sides.

In this case, the first side and the third side may be disposed to face each other, the second side and the fourth side may be disposed to face each other, the first side and the second side may be adjacent to each other, and the third side and the fourth side may be adjacent to each other.

The second region of the support plate 22 may extend from the first side of the first region and may be disposed with the at least one fastening hole 26 through which the fastening screw (82, FIG. 2) for coupling with the bottom chassis (10, FIG. 1) penetrates.

The third region of the support plate 22 may extend from the second side of the first region adjacent to the first side and may be disposed with the at least one fastening hole 26 through which the fastening screw (82, FIG. 2) for coupling with the bottom chassis (10, FIG. 1) penetrates.

The corner region of the display panel (30, FIG. 1) may be seated on parts of the first, second and third regions constituting the support plate 22.

The reinforcing rib 28 may protrude from an upper surface of the support plate 22 and may be formed at a corner region of the support plate 22 in a matrix shape.

The fixing rib 24 may include first and second ribs 24a and 24b and a fixing plate 24c.

The fixing plate 24c may come into contact with a lower surface of the support plate 22, and the first and second ribs 24a and 24b may extend from the fixing plate 24c and be coupled to the bottom chassis (10, FIG. 1).

The first and second ribs 24a and 24b may be spaced apart from each other by a first distance to define a space for insertion of the bottom chassis (10, FIG. 1).

The first distance between the first and second ribs 24a and 24b may be greater than a thickness of the bottom chassis (10, FIG. 1).

This allows a lateral surface of the bottom chassis to be easily inserted into the space between the first and second ribs 24a and 24b when the fixing rib 24 is coupled to the bottom chassis.

When the fixing rib 24 is coupled to the bottom chassis, the first rib 24a of the fixing rib 24 may be located inside the bottom chassis and the second rib 24b of the fixing rib 24 may be located outside the bottom chassis.

Additionally, to ensure more stable coupling between the fixing rib 24 and the bottom chassis, a thickness of the first rib 24a may be greater than a thickness of the second rib 24b.

The panel guide module 20 may be formed of a polymer resin, such as e.g., plastic, suitable for injection molding.

For example, the panel guide module 20 may be formed of at least one selected from among unsaturated polyester, methyl methacrylate, ethyl methacrylate, isobutyl methacrylate, N-butyl methacrylate, acrylic acid, methacrylic acid, hydroxyl ethyl methacrylate, hydroxyl propyl methacrylate, hydroxyl ethyl acrylate, acrylamide, ethyl acrylate, isobutyl acrylate and N-butyl acrylate.

As described above, the panel guide module 20 consists of four L-shaped pieces mounted respectively at four corners of the bottom chassis, thereby serving to stably support the display panel.

Figure 4:
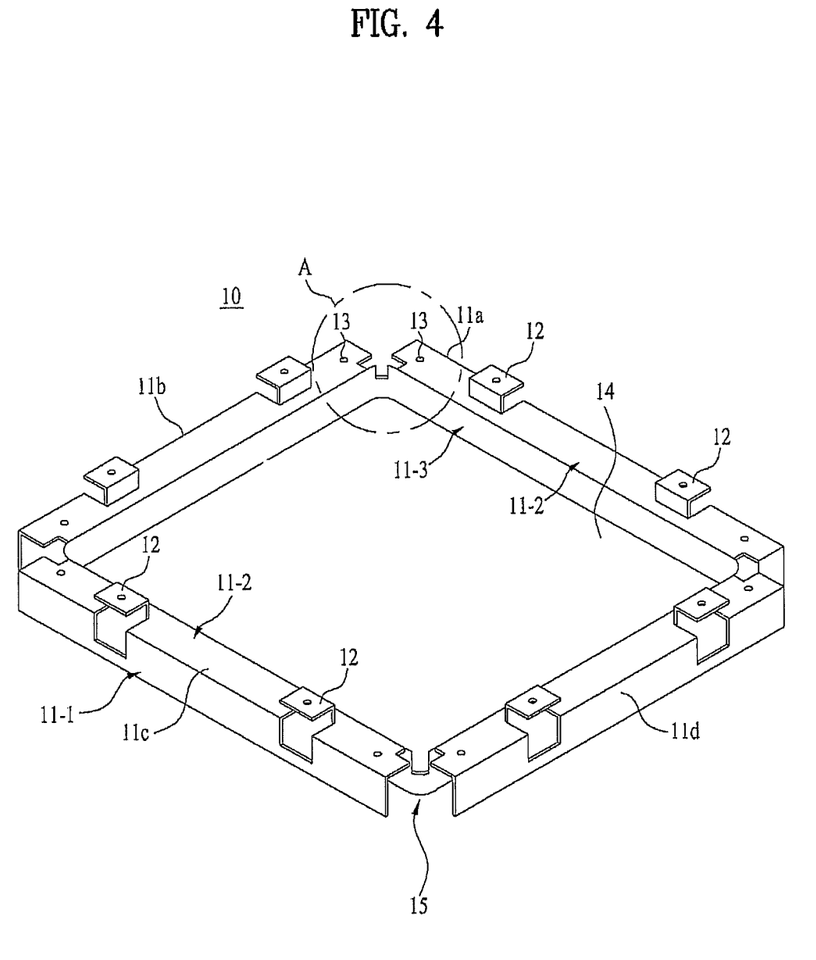
FIG. 4 is a view illustrating a bottom chassis of FIG. 1.
Figure 5:
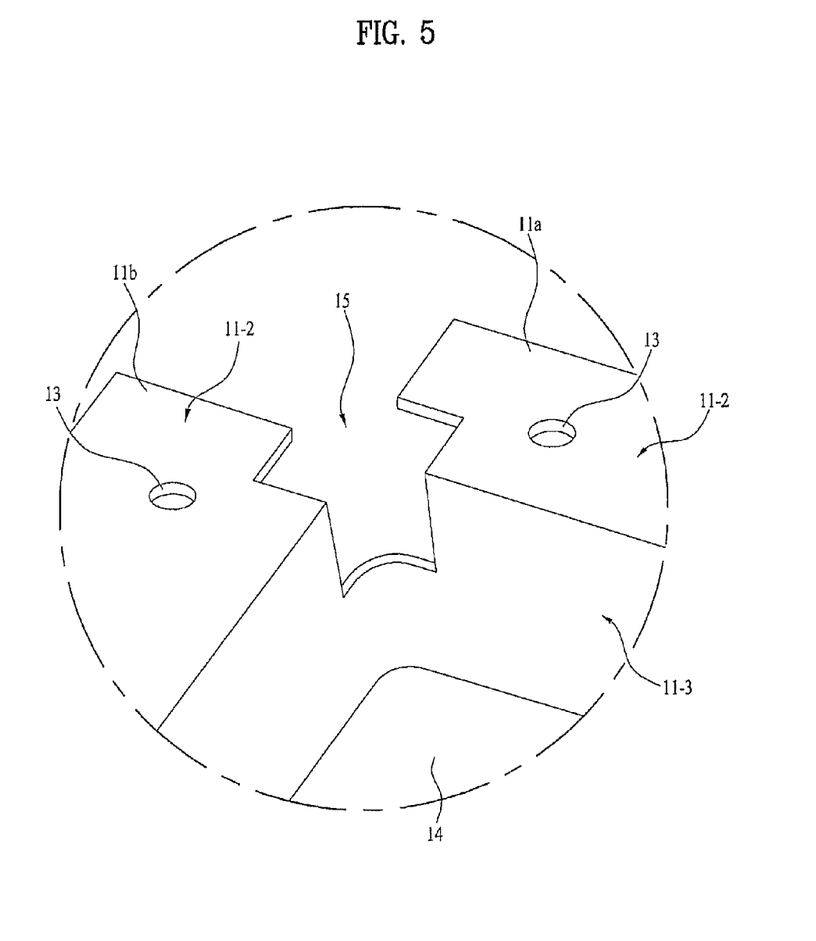
FIG. 5 is a view illustrating a corner region A of the bottom chassis of FIG. 4 in detail.

FIG. 4 is a view illustrating the bottom chassis of FIG. 1, and FIG. 5 is a view illustrating a corner region A of the bottom chassis of FIG. 4 in detail.

As illustrated in FIGS. 4 and 5, the bottom chassis 10 may include a bottom surface 14, which is oriented to face the display panel (30, FIG. 1), and a lateral surface 11 which extend from the bottom surface 14 to surround the bottom surface 14. The lateral surface 11 may include first, second, third and fourth lateral surfaces 11a, 11b, 11c and 11d.

The bottom surface 14 of the bottom chassis 10 may have first, second, third and fourth sides. The first lateral surface 11a may extend from the first side of the bottom surface 14, the second lateral surface 11b may extend from the second side of the bottom surface 14, the third lateral surface 11c may extend from the third side of the bottom surface 14, and the fourth lateral surface 11d may extend from the fourth side of the bottom surface 14.

The respective lateral surfaces of the bottom chassis 10 may be constructed by first, second and third segments.

The first segment 11-3 may extend from an edge of the bottom surface 14 in a direction perpendicular to the bottom surface 14, and the second segment 11-2 may extend from an edge of the first segment 11-3 in a direction parallel to the bottom surface 14.

The third segment 11-1 may extend from an edge of the second segment 11-2 in a direction parallel to the first segment 11-3 and thus, may be oriented to face the first segment 11-3.

The first segment 11-3 may be disposed at each corner region thereof with a coupling recess 15, into which the fixing rib (24, FIG. 3) of the panel guide module (20, FIG. 1) is inserted.

The second segment 11-2 may be disposed at each corner region thereof with at least two fastening holes 13, through which the fastening screws (82, FIG. 1) for coupling with the support plate (22, FIG. 3A) of the panel guide module (20, FIG. 1) penetrate.

The second segment 11-2 may be disposed with coupling protrusions 12 for coupling with the top chassis (80, FIG. 1). The coupling protrusions 12 protrude upward from the edge of the second segment 11-2 adjacent to the third segment 11-1.

Each of the coupling protrusions 12 may have at least one fastening hole, through which a fastening screw for coupling with the top chassis (80, FIG. 1) penetrates.

Although at least one coupling protrusion 12 may be disposed at each of the first, second, third and fourth lateral surfaces 11a, 11b and 11c of the bottom chassis, as occasion demands, only the two facing lateral surfaces may be disposed with the coupling protrusions 12.

Figure 6:
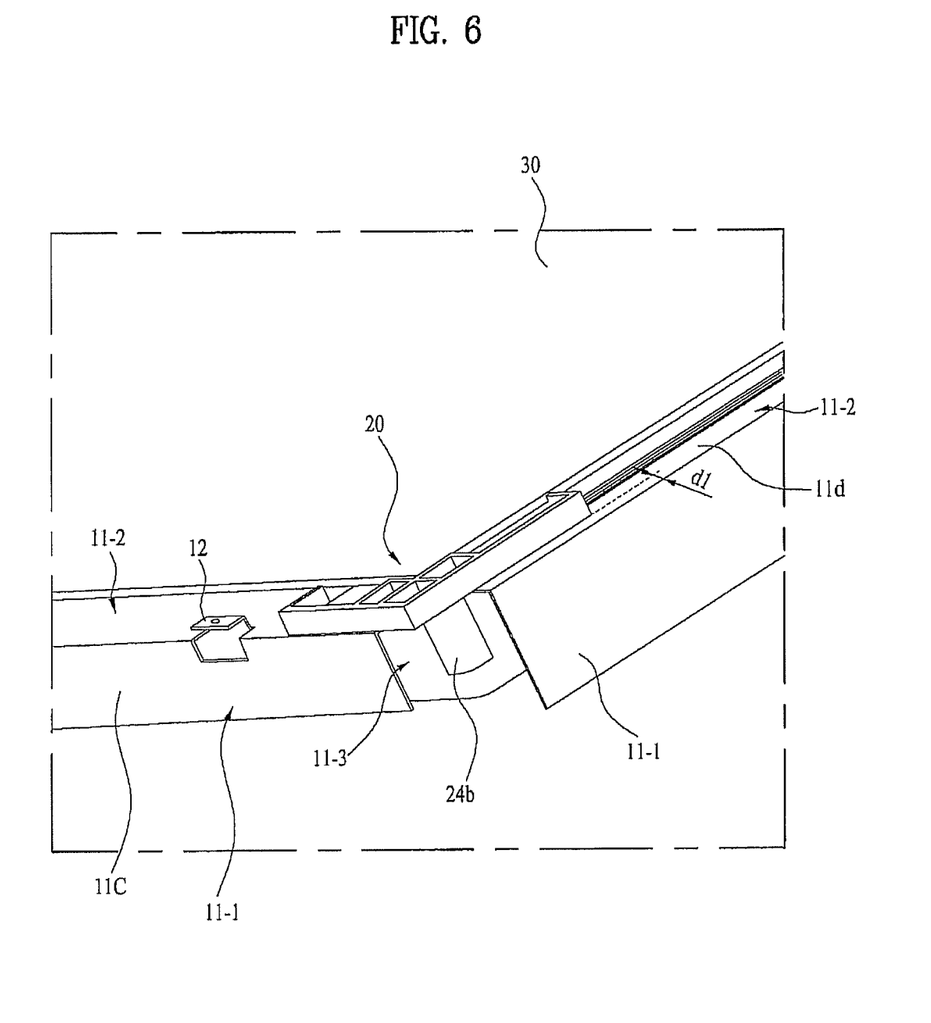
FIGS. 6 to 8 are views illustrating a panel guide module coupled to the corner region of the bottom chassis.
Figure 7:
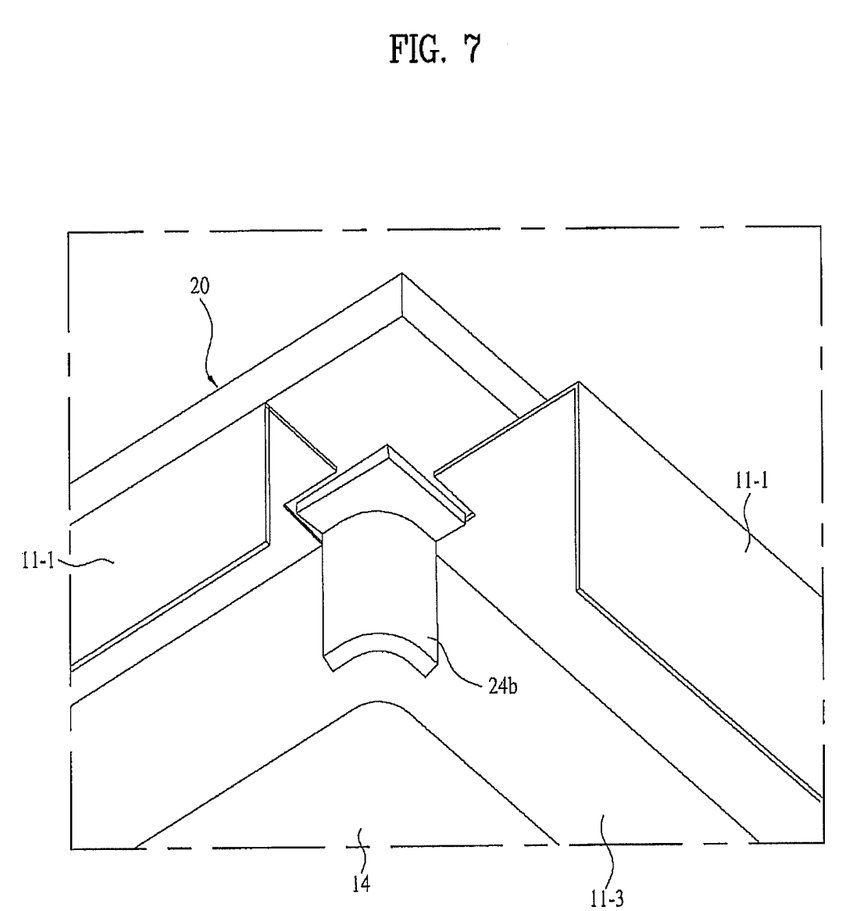
Figure 8:
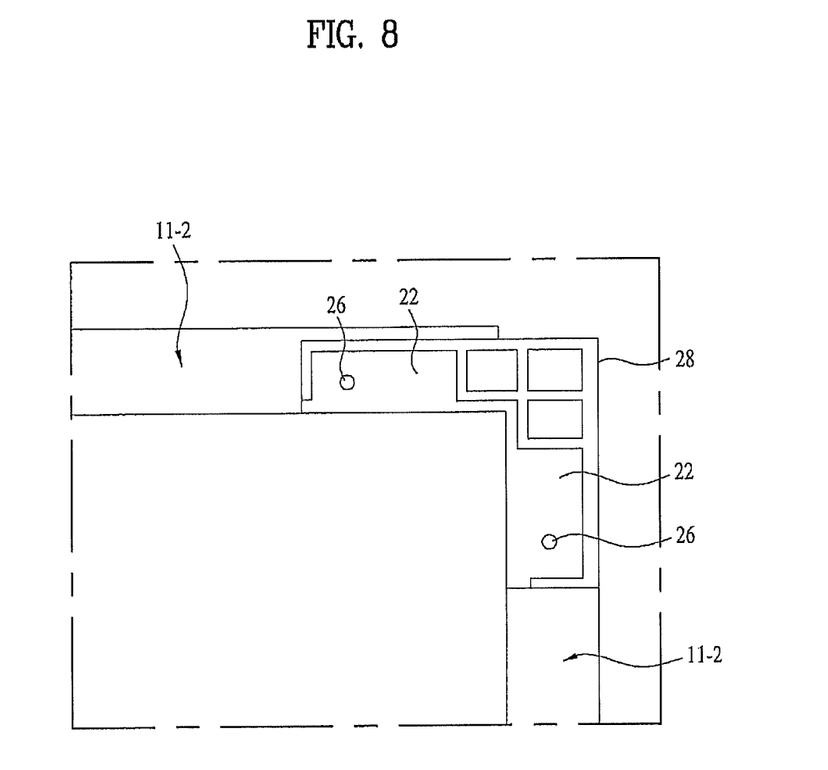

FIGS. 6 to 8 are views illustrating the panel guide module coupled to the corner region of the bottom chassis. Specifically, FIG. 6 is a perspective view illustrating an upper surface of the panel guide module coupled to the corner region of the bottom chassis, FIG. 7 is a perspective view illustrating a lower surface of the panel guide module coupled to the corner region of the bottom chassis, and FIG. 8 is a plan view illustrating an upper surface of the panel guide module coupled to the corner region of the bottom chassis.

As illustrated in FIGS. 6 to 8, the support plate 22 of the panel guide module 20 may come into contact at a lower surface thereof with the corner region of the second segment 11-2 among the lateral surface of the bottom chassis 10.

The fixing rib 24 of the panel guide module 20 may be engaged with the corner region of the bottom chassis 10.

Specifically, as the first segment 11-3 of the lateral surface of the bottom chassis 10 is inserted into a space between the first rib 24a and the second rib 24b of the fixing rib 24, the bottom chassis 10 and the panel guide module 20 may be coupled to each other.

When the support plate 22 of the panel guide module 20 is located at the corner region of the second segment 11-2 among the lateral surface of the bottom chassis 10, a distal end of the second segment 11-2 may coincide with a distal end of the support plate 22 of the panel guide module 20, or may be spaced apart from the distal end of the panel guide module 20 by a predetermined distance.

For example, as illustrated in FIG. 6, the support plate 22 of the panel guide module 20 may be disposed at a distance d1 from the distal end of the second segment 11-2.

As occasion demands, the support plate 22 of the panel guide module 20 may coincide with the distal end of the second segment 11-2.

In this case, a lateral surface of the support plate 22 of the panel guide module 20 and a surface of the third segment 11-1 may be located on the same plane.

The fastening hole 26 perforated in the support plate of the panel guide module 20 may be formed at the same position as the fastening hole of the top chassis (80, FIG. 2) and the fastening hole of the bottom chassis (10, FIG. 2). With provision of the fastening screw penetrating through the respective fastening holes, the panel guide module (20, FIG. 2), the top chassis (80, FIG. 2) and the bottom chassis (10, FIG. 2) may be coupled to one another at a time.

As described above, the panel guide module 20, which consists of four "L"-shaped pieces mounted respectively at four corner regions of the bottom chassis 10, can disposed the display panel with stable support force.

Accordingly, owing to simplified coupling of the panel guide module to the corner region of the bottom chassis, the configuration of the entire backlight unit is simplified, which may result in easy assembly and minimized weight of the backlight unit as well as lower material costs and mold costs.

Figure 9:
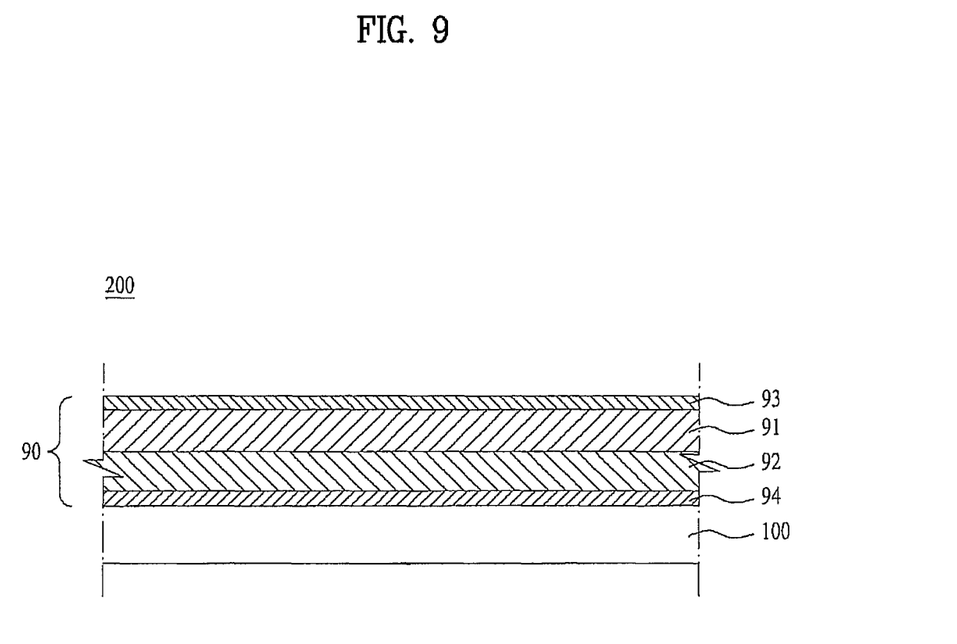
FIG. 9 is a view illustrating a display module having a backlight unit according to an embodiment.

FIG. 9 is a view illustrating a display module having a backlight unit according to an embodiment.

As illustrated in FIG. 9, the display module 200 may include a display panel 90 and a backlight unit 100.

The display panel 90 may include a color filter substrate 91 and a Thin Film Transistor (TFT) substrate 92, which are bonded to face each other with a uniform cell gap therebetween. A liquid crystal layer (not shown) may be interposed between the two substrates 91 and 92.

The color filter substrate 91 includes a plurality of pixels each consisting of red (R), green (G) and blue (B) sub pixels, and may produce red, green and blue images when light is applied thereto.

Although the pixels may consist of red, green and blue sub pixels, the disclosure is not limited thereto and a single pixel may consist of red, green, blue and white (W) sub pixels.

The TFT substrate 92 may be disposed with switching devices to switch pixel electrodes (not shown).

For example, a common electrode (not shown) and pixel electrode may vary the arrangement of molecules in a liquid crystal layer according to a predetermined voltage applied from an external power source, Specifically, the liquid crystal layer includes a plurality of liquid crystal molecules, and the liquid crystal molecules may be differently disposed according to a voltage difference generated between the pixel electrode and the common electrode.

Thereby, introduction of light from the backlight unit 100 to the color filter substrate 91 may vary based on the molecular arrangement of the liquid crystal layer.

An upper polarizing plate 93 and a lower polarizing plate 94 may respectively define an upper surface and a lower surface of the display panel 90. More specifically, the upper polarizing plate 93 may be disposed on an upper surface of the color filter substrate 91 and the lower polarizing plate 94 may be disposed under a lower surface of the TFT substrate 92.

Although not illustrated, gate and data drivers may be disposed at a lateral surface of the display panel 90, to generate drive signals required to drive the panel 90.

As illustrated in FIG. 9, the display module 200 may be constructed in such a way that the backlight unit 100 comes into close contact with the display panel 90.

For example, the backlight unit 100 may be fixedly attached to the lower surface of the display panel 90, more particularly, to the lower polarizing plate 94. To this end, an adhesive layer (not shown) may be interposed between the lower polarizing plate 94 and the backlight unit 100.

When the backlight unit 100 comes into close contact with the display panel 90, the thickness of the entire display apparatus may be reduced, resulting in enhanced external appearance. Moreover, an additional structure of securing the backlight unit 100 may be omitted, which may simplify the configuration and fabrication of the display apparatus.

In addition, since there exists no space between the backlight unit 100 and the display panel 90, it is possible to prevent malfunction of the display apparatus or deterioration in the quality of images being displayed caused when foreign substances invade a gap between the backlight unit 100 and the display panel 90.

Figure 10:
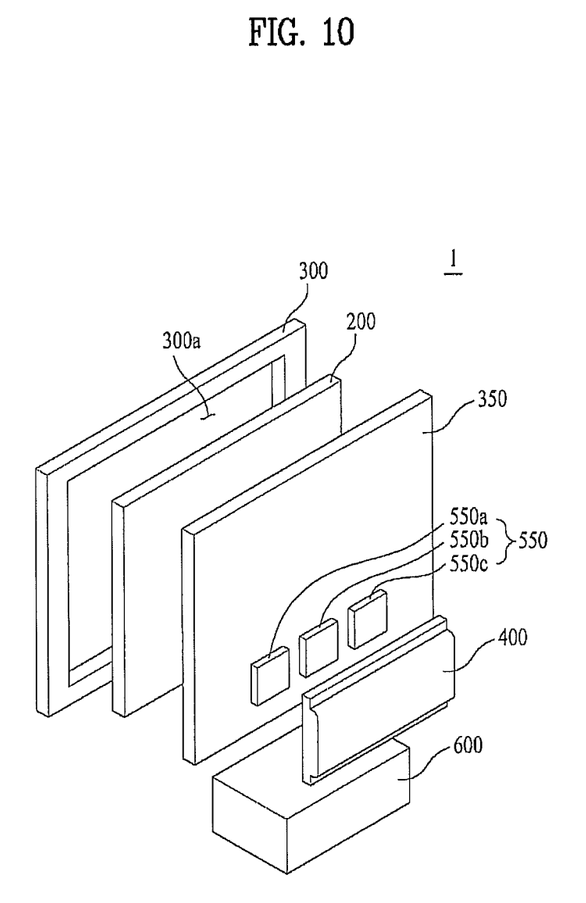
FIGS. 10 and 11 are views illustrating a display apparatus according to an embodiment.
Figure 11:
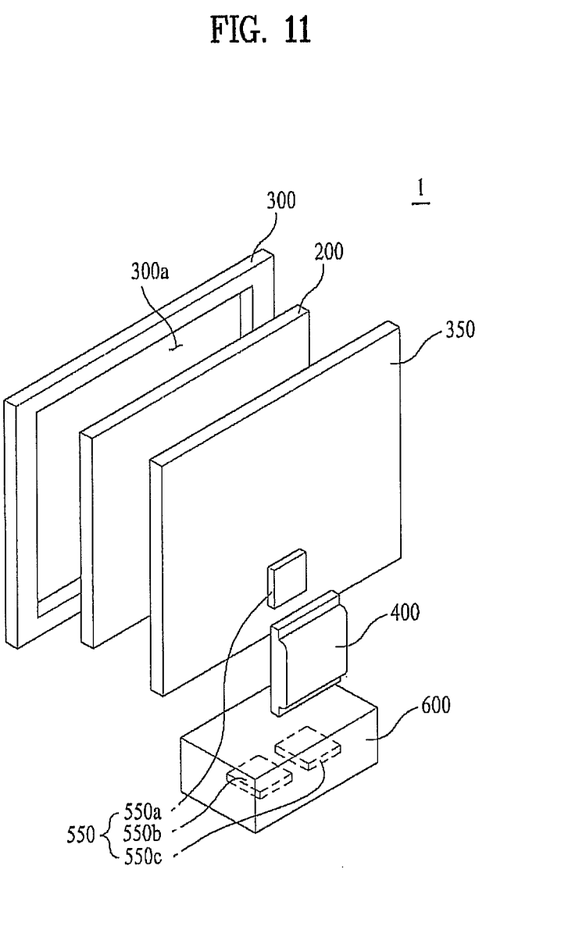

FIGS. 10 and 11 are views illustrating a display apparatus according to an embodiment.

Referring to FIG. 10, the display apparatus 1 may include the display module 200, a front cover 300 configured to surround the display module 200, a back cover 350, a drive unit 550 disposed at the back cover 350, and a drive unit cover 400 to enclose the drive unit 550.

The front cover 300 may include a transparent front panel (not shown) to transmit light. The front cover 300 serves to protect the display module 200 spaced apart therefrom by a predetermined distance and transmit light emitted from the display module 200, allowing an image displayed on the display module 200 to be seen from the outside.

Although the embodiment illustrates the front cover 300 as having a window 300a, the front cover may be replaced with a flat panel having no window. In this case, the front cover 30 may be formed by injection molding a transparent light transmitting material, such as e.g., plastic.

When the front cover 300 takes the form of the flat panel, the front cover may have a frameless configuration.

The back cover 350 may be coupled to the front cover 300, thereby acting to protect the display module 200.

The drive unit 550 may be attached to a surface of the back cover 350.

The drive unit 550 may include a drive controller 550a, a main board 550b and a power supply 550c.

The drive controller 550a may be a timing controller. The drive controller 550a serves to adjust an operation timing of each driver IC of the display module 200. The main board 550b may serve to transmit V-sync, H-sync and R, G and B resolution signals to the timing controller. The power supply 550c supplies power to the display module 200.

The drive unit 550 may be attached to the back cover 350 and be enclosed by the drive unit cover 400.

The back cover 350 has a plurality of holes, through which the display module 200 may be connected to the drive unit 550. Also, a stand 600 to support the display apparatus 1 may be disposed.

In an alternative embodiment, as illustrated in FIG. 11, the drive controller 550a of the drive unit 550 may be disposed at the back cover 350, whereas the main board 550b and the power supply 550c may be disposed in the stand 600.

The drive unit cover 400 may be configured to enclose only the drive unit 550 disposed at the back cover 350.

Although the present embodiment illustrates the main board 550b and the power supply 550c as being disposed separately, they may be integrated, without being limited thereto.

In other embodiments, a display device, an indicating device, and a lighting system including the first and second reflectors and the light source module as described in the above embodiments may be realized. For example, the lighting system may be a lamp or a street lamp.

The lighting system may serve as a light including a plurality of LEDs, and in particular, may take the form of a built-in light (e.g., an LED down light) that is embedded in the ceiling or wall of a building such that an opening of a shade is exposed to the outside.

As is apparent from the above description, according to the embodiments, a panel guide module consists of four "L"-shaped pieces suited to be simply coupled to four corner regions of a bottom chassis, which can simplify the configuration of the entire backlight unit, resulting in easy assembly and minimized weight of the backlight unit as well as lower material costs and mold costs.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lighting apparatus comprising:
    a bottom chassis; and
    a panel guide module coupled to a corner region of the bottom chassis so as to support a display panel,
        wherein the panel guide module includes:
            a support plate to support a corner region of the display panel;
            a reinforcing rib disposed on the support plate; and
            a fixing rib disposed under the support plate and coupled to the bottom chassis,
        wherein the fixing rib includes:
            a fixing plate disposed under the support plate; and
            first and second ribs extending from the fixing plate and coupled to the bottom chassis,
            wherein the first and second ribs are spaced apart from each other by a first distance to define a space for insertion of the bottom chassis.

2. The lighting apparatus according to claim 1, wherein the support plate has at least two fastening holes, through which fastening screws for coupling with the bottom chassis penetrate.

3. The backlight lighting apparatus according to claim 1, wherein the support plate includes:
    a first region having first, second, third and fourth sides, on which the reinforcing rib and the fixing rib are disposed;
    a second region extending from the first side of the first region and having at least one fastening hole, through which a fastening screw for coupling with the bottom chassis penetrates; and
    a third region extending from the second side adjacent to the first side of the first region and having at least one fastening hole, through which a fastening screw for coupling with the bottom chassis penetrates.

4. The lighting apparatus according to claim 3, wherein a corner region of the display panel is disposed on parts of the first, second and third regions of the support plate.

5. The lighting apparatus according to claim 1, wherein the reinforcing rib protrudes from an upper surface of the support plate and is disposed on a corner region of the support plate in a lattice form.

6. The lighting apparatus according to claim 1, wherein the first rib is disposed inside the bottom chassis and the second rib is disposed outside the bottom chassis.

7. The lighting apparatus according to claim 6, wherein a thickness of the first rib is greater than a thickness of the second rib.

8. The lighting apparatus according to claim 1, wherein the first distance between the first and second ribs is greater than a thickness of the bottom chassis.

9. A lighting apparatus comprising:
    a bottom chassis; and
    a panel guide module coupled to a corner region of the bottom chassis so as to support a display panel,
        wherein the panel guide module includes:
            a support plate to support a corner region of the display panel;
            a reinforcing rib disposed on the support plate; and
            a fixing rib disposed under the support plate and coupled the bottom chassis,
        wherein the bottom chassis includes:
            a bottom surface disposed to face the display panel; and
            a lateral surface extending from the bottom surface to surround a periphery of the bottom surface,
        wherein the lateral surface includes:
            a first segment extending from an edge of the bottom surface in a direction perpendicular to the bottom surface;
            a second segment extending from an edge of the first segment in a direction parallel to the bottom surface; and
            a third segment extending from an edge of the second segment in a direction parallel to the first segment so as to face the first segment.

10. The lighting apparatus according to claim 9, wherein the first segment is disposed at a corner region thereof with a coupling recess for coupling with the fixing rib of the panel guide module.

11. The lighting apparatus according to claim 9, wherein the second segment is disposed at a corner region thereof with at least two fastening holes, through which a fastening screw for coupling with the support plate of the panel guide module penetrates.

12. The lighting apparatus according to claim 9, wherein the support plate of the panel guide module comes into contact at a lower surface thereof with a corner region of the second segment.

13. The lighting apparatus according to claim 9, wherein a distal end of the second segment coincides with a distal end of the support plate of the panel guide module, or is disposed at a predetermined distance from the distal end of the support plate of the panel guide module.

14. The lighting apparatus according to claim 9, wherein the second segment is disposed at an edge region thereof adjacent to the third segment with a coupling protrusion for coupling with a top chassis.

15. The lighting apparatus according to claim 14, wherein the coupling protrusion has at least one fastening hole, through which a fastening screw for coupling with the top chassis penetrates.

16. The lighting apparatus according to claim 1, wherein the panel guide module is formed of at least one selected from the group consisting of unsaturated polyester, methyl methacrylate, ethyl methacrylate, isobutyl methacrylate, N-butyl methacrylate, acrylic acid, methacrylic acid, hydroxyl ethyl methacrylate, hydroxyl propyl methacrylate, hydroxyl ethyl acrylate, acrylamide, ethyl acrylate, isobutyl acrylate and N-butyl acrylate.

17. The lighting apparatus according to claim 1, further comprising:
   a reflector disposed on the bottom chassis;
   a light guide plate disposed on the reflector and having at least one recess indented in a lower surface thereof;
   a light source disposed in the recess of the light guide plate;
   an optical member disposed on the light guide plate; and
   a top chassis coupled to the panel guide module and the bottom chassis.

18. The lighting apparatus according to claim 17, wherein the top chassis, the bottom chassis and the panel guide module are coupled to one another by means of fastening holes formed at the same position thereof and a fastening screw penetrating through the fastening holes.

19. A display apparatus comprising:
   a display panel;
   a bottom chassis; and
   a panel guide module coupled to only a corner region of the bottom chassis so as to support a display panel,
      wherein the panel guide module includes:
         a support plate to support a corner region of the display panel;
         a reinforcing rib disposed on the support plate; and
         a fixing rib disposed under the support plate and configured to be coupled to the bottom chassis.

20. The display apparatus of claim 19, wherein the fixing rib includes:
   a fixing plate disposed under the support plate; and
   first and second ribs extending from the fixing plate and coupled to the bottom chassis,
   wherein the first and second ribs are spaced apart from each other by a first distance to define a space for insertion of the bottom chassis.

\* \* \* \* \*